April 10, 1928.

T. OLINGER

DAMPER

Filed Jan. 17, 1927

Inventor
Thomas Olinger
By Frank E. Liverance, Jr.
Attorney.

Patented Apr. 10, 1928.

1,665,716

UNITED STATES PATENT OFFICE.

THOMAS OLINGER, OF HOLLAND, MICHIGAN, ASSIGNOR TO FEDERAL MANUFACTURING COMPANY, OF HOLLAND, MICHIGAN, A CORPORATION OF MICHIGAN.

DAMPER.

Application filed January 17, 1927. Serial No. 161,499.

This invention relates to a damper designed for use for hot air pipes in furnaces. It is a primary object and purpose of this invention to make an exceptionally economical construction of damper which may be readily and easily applied and assembled with furnace pipes and in which waste sheet metal may be utilized so that the production cost is at a minimum.

The preferred embodiment of the invention is fully described in the following description and shown in the accompanying drawing, in which, Fig. 1 is a cross section through a furnace pipe equipped with the damper of my invention.

Like reference characters refer to like parts in the different figures of the drawing.

Figure 1:
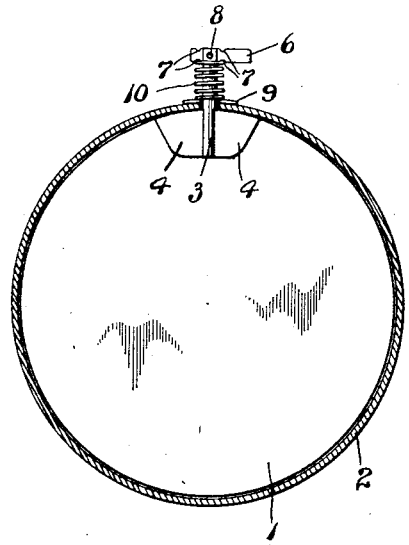

The damper disk 1 is a circular plate of thin sheet metal of a size that fits easily within the furnace pipe 2. In practice the disk is turned about a vertical axis and the means for turning the disk is attached thereto and extends through the upper side of the pipe.

The devices which I use for this purpose are duplicate parts, each made of sheet metal. Each includes a semi-cylindrical section 3 from each edge of which at its lower portion wings 4 are turned outwardly in opposite directions. At the upper end of each part 3 parts are cut away at the edges so as to define a vertical slot 5 at each side of the cylindrical member made when the two parts are brought together against opposite sides at one edge of the disk 1.

Figure 4:
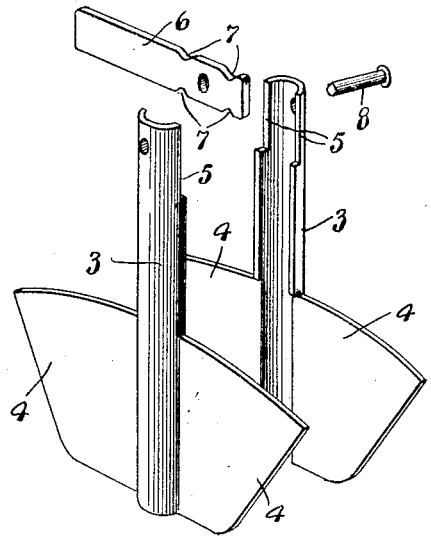
Fig. 4 is an enlarged perspective view of the parts which are attached to the damper disk at one side in completing the manufacture thereof.

The two parts described are placed at opposite sides of the damper disk and the wings 4 permanently secured by spot welding or other equivalent fastening means. The adjacent edges of the sections 3 come together making the slots at 5 in the opposite sides at the upper end. In such slots a handle 6 is located, it having an opening through it adjacent one end adapted to come into alinement with openings made in upper ends of the sections 3. The handle 6 at its opposite edges and at each side of the opening therein is formed with a recess or notch 7, best shown in Fig. 4. A pivot pin 8 passes through the various openings described and is headed over so that the handle 6 is permanently secured but may be turned either to lie in alignment with the tube made by the two semitubular sections 3 or it can be turned at right angles to such position.

Figure 2:
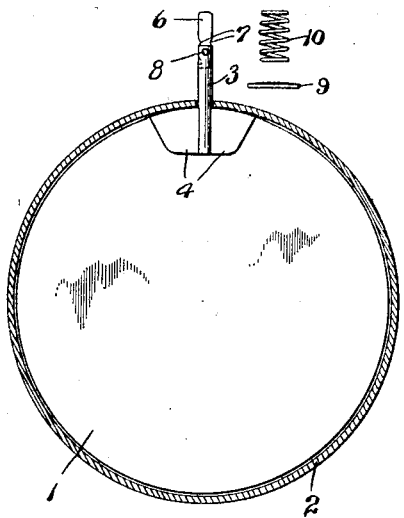
Fig. 2 is a similar view showing the damper partially assembled with the pipe.
Figure 3:
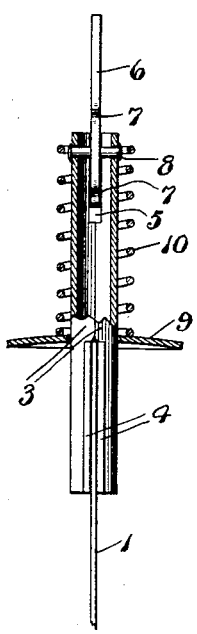
Fig. 3 is a partial side elevation and vertical section of damper construction, the damper disk being shown fragmentarily.

The damper as thus made is assembled with the pipe 2, the handle 6 being located in alignment with the tube described so that it and said tube may be inserted through an opening in the pipe 2 as shown in Fig. 2. After this has been done a disk 9 of sheet metal having a central opening therein is placed over said tube, which may be called the stem of the damper, and then a coiled spring 10 located against said disk and around the stem. By turning the handle 6 to the position shown in Fig. 1, opposite sides of the upper coil of the spring seat in the notches 7 at the under side of the handle 6, holding the handle in position against accidental movement which might occur, whereby the handle 6 might align with the stem and permit the spring to disassemble from the damper. The handle 6 of course may be turned in either direction because of the notches 7 in both edges of the handle.

This construction of damper is very cheap to produce. The metal used for the disks is thin and of light weight and in most instances is obtained from waste sheet metal left over from manufacturing furnace casings, pipes and the like. The parts which go to produce the stem and the attaching means therefor are also of sheet metal. These parts are duplicates, made with the same dies and also may be made from sheet metal otherwise waste. The handle 6 of course is very simply and easily produced from sheet metal. The economy in manufacture is self evident. At the same time a very practical, effective, serviceable and durable damper is produced. The invention is defined in the appended claims and is to be considered comprehensive of all forms of structure coming within their scope.

I claim:

1. A damper comprising, a circular disk of sheet metal, two members of like construction located at one edge of the disk, each including a semi-cylindrical section with oppositely extending wings at its inner end, said wings lying against opposite sides of the damper disk and being permanently secured thereto, and said sections fitting together and forming a tubular outwardly extending stem, substantially as described.

2. A construction containing the elements in combination defined in claim 1, said stem being slotted at its outer end, and a handle located in said slot and pivotally mounted on said stem, said handle consisting of a flat strip of metal and having recesses in an edge thereof, one at each side of the pivot passing through the handle, and a spring surrounding the stem and seated in the recesses in the handle.

3. A damper comprising a damper disk of sheet metal and two members of sheet metal of identical construction attached one at each side and at one edge of the disk, said two members extending beyond the periphery of the disk and fitting together and providing an outwardly extending stem adapted to pass through a side of a pipe in which the damper is installed.

4. A damper comprising a damper disk of sheet metal, two members of sheet metal of identical construction located one at each side of the disk at an edge thereof directly opposite each other and permanently secured to the disk, each of said members at its outer portion comprising one-half of an outwardly extending stem fitting together and providing a stem adapted to pass through an opening in a pipe in which the damper is installed, said stem at its outer end being longitudinally slotted for a short distance, and a flat handle located in said slot and pivotally mounted at the outer end of the stem.

5. A construction containing the elements in combination defined in claim 4, said handle at each edge and at each side of the pivot passing therethrough having a notch or recess formed therein, and a spring surrounding the stem and bearing in the recesses in the handle.

6. In combination with a furnace hot air pipe a circular disk of sheet metal located within the pipe, a stem attached to and located at one edge of the disk passing outwardly through an opening in the pipe, said stem being slotted at its outer end, a handle of flat metal located at one end in said slot, means pivotally connecting handle to the stem and a coiled spring located around the stem between the pipe and said handle.

7. A damper comprising, a disk adapted to be located within a pipe, a stem fixed to the disk and projecting radially from its periphery and a handle member having a width no greater than the width of the stem, said handle member being considerably longer than its width and pivoted between its ends to the outer end of the stem.

8. A damper comprising a disk adapted to be located within a pipe, a stem fixed to the disk and extending beyond the periphery thereof and adapted to be extended through a hole in the pipe, a handle member having a width no greater than the width of the stem and having a length considerably greater than its width and pivoted between its ends to the outer end of the stem at a point spaced from either of its ends a distance greater than half its width.

9. A damper comprising a disk adapted to be located within a pipe, a stem attached to the disk and extending beyond the periphery thereof and adapted to be extended through a hole in the pipe, a handle member having a width no greater than the width of the stem and a length considerably greater than its width and pivoted between its ends to the outer end of the stem at a point whereby it will extend at each side of the stem when turned at right angles thereto, and a spring surrounding the stem and engageable with the handle when turned at right angles to the stem.

In testimony whereof I affix my signature.

THOMAS OLINGER.